(No Model.)

J. W. CRAIG.
CORN PLANTER.

No. 376,370. Patented Jan. 10, 1888.

WITNESSES

James W. Craig.
INVENTOR
Attorney

UNITED STATES PATENT OFFICE.

JAMES W. CRAIG, OF COYVILLE, KANSAS.

CORN-PLANTER.

SPECIFICATION forming part of Letters Patent No. 376,370, dated January 10, 1888.

Application filed September 15, 1887. Serial No. 249,821. (No model.)

*To all whom it may concern:*

Be it known that I, JAMES W. CRAIG, a citizen of the United States of America, residing at Coyville, in the county of Wilson and State of Kansas, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in corn-planters and markers, the object of my invention being to provide means whereby the corn can be dropped at regular intervals and covered, the planter being provided with markers and means for moving the axle upon which the covering-wheels are supported, so as to properly adjust the markers when desired.

My invention consists in the construction and combination of the parts, as will be hereinafter fully set forth, and specifically pointed out in the claims.

Figure 1:
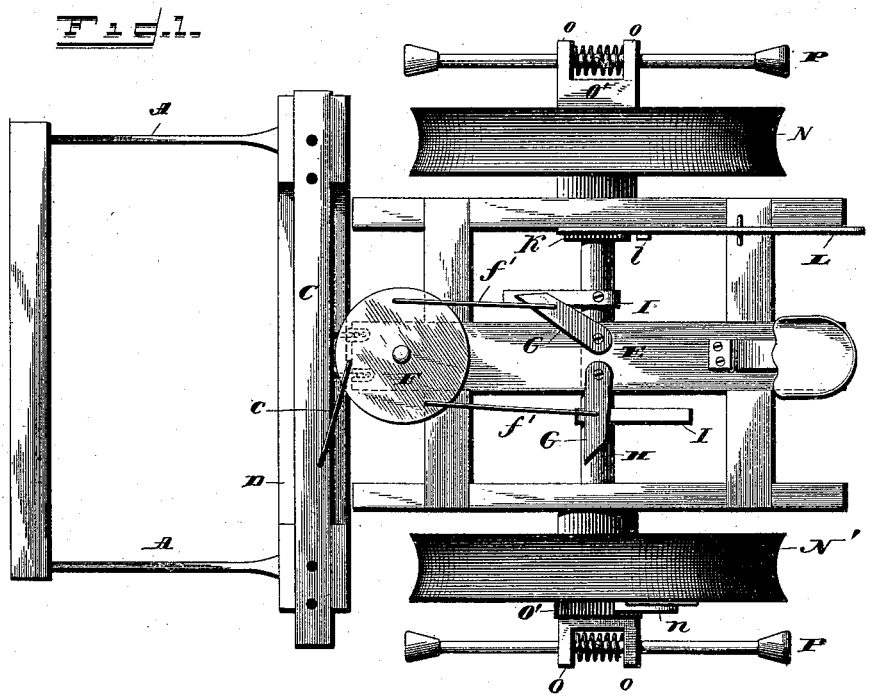
Figure 2:
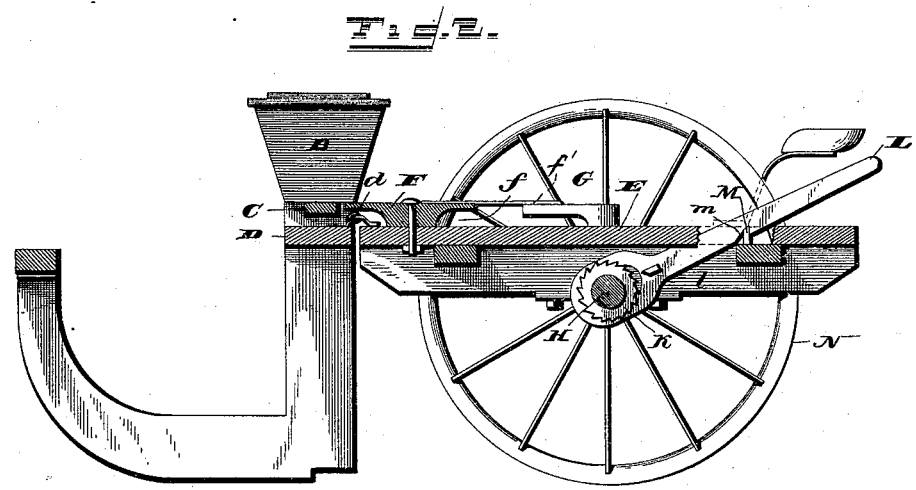

In the accompanying drawings, which illustrate my invention, Figure 1 is a plan view of a corn-planter constructed in accordance with my improvement, and Fig. 2 is a vertical sectional view.

A refers to the runners or furrow-openers, which are rigidly attached to the front frame of the planter, these runners supporting at their rear ends the seed-boxes B, beneath which is located a reciprocating slide, C. To the front cross-beam, which connects the runners to each other, the pole or other draft mechanism is attached, and near the upper ends of the rear vertical portion of the runners is attached a cross-beam, which is provided near its center portion with staples or hooks $d$, to which suitable links attached to the center beam of the rear frame engage, so as to connect the front and rear frame to each other.

The rear frame of the planter is provided, centrally, with a horizontal beam, E, to the front end of which is suitably secured a disk, F, the under periphery of which is cut away, as shown at $f$, so that the same will have but little friction, and will provide a clearance for the links which connect the front and rear frames to each other. The disk F is oscillated by suitable mechanism, which will be hereinafter described, and is connected to the seed-slide C by the bar or link $c$.

To the rear portion of the horizontal beam E is attached a driver's seat, and centrally to this beam are pivoted arms G G, which are connected to the disk F by bars $f'\,f'$.

The rear frame is provided with suitable bearings for the axle H. This axle has rigidly but adjustably attached thereto arms I I, the ends of which contact, when the axle is rotated, with the arms G G, so as to oscillate the disk F and reciprocate the seed-slide. The length of the movement of the slide can be regulated and adjusted by moving the arms I I upon the axle, so as to bring the point of contact of said arms with the pivoted arms G a greater or less distance from the pivots of the arms G. Thus, according to the adjustment of the arms I I upon the axle, the oscillation of the disk F is regulated.

Upon the axle H, adjacent to one of the longitudinal side bars of the main frame, is rigidly attached a ratchet-wheel, K, and between this ratchet-wheel and the beam of the frame adjacent thereto, upon the axle, is secured a lever, L, the lower end thereof being enlarged and provided with a slot through which the axle passes. This lever L is provided with a rigid pawl, $l$, and with a notch, $m$, which will engage with the catch M upon the frame, so as to hold the pawl $l$ out of engagement with the ratchet when desired. When it is desired to throw the pawl of the lever in engagement with the ratchet-wheel, said lever is raised, so as to bring the notch $m$ out of engagement with the catch, and said lever will move by gravity into engagement with the ratchet-teeth of the ratchet-wheel, and by raising said lever the axle can be turned so as to bring the arms I and the markers, which are rigidly secured to said axle, in the proper position with relation to the hills in the row last planted.

The supporting and covering wheels N N' are mounted loosely on the center axle, and one of said wheels is provided with a spring-pawl, $n$, which will engage with the ratchet-teeth which are formed upon the boss, which is integral with the support O', which supports the markers. The supports O' for the markers have projecting arms o, which are perforated, and through said perforations the marking-arms pass, said marking-arms being provided centrally with pins which engage with spiral springs so as to allow a slight spring movement of said arms, so that they may move with the slight inequalities of the ground without elevating the rear frame. The axle, it will be observed, is driven or caused to rotate by the spring-pawl n, which is attached to the wheel N', engaging with the boss O.

By the construction hereinbefore described I provide a planter which is simple in construction and can be readily adjusted.

By recessing the under side of the disk F the front portion of the frame can have a slight play or movement without contacting with the disk F, which is attached near the front portion of the rear frame.

By attaching the operating mechanism to the center beam of the main frame the same will be located so that it can be readily observed by the driver.

By slotting the lower end of the lever and passing the axle through said slot a cheap and convenient means is provided for supporting the end of the lever.

I claim—

1. The combination of the front frame having runners, seed-boxes, and a reciprocating slide, the rear frame provided with a central beam coupled to the front frame, a disk recessed on its under side and secured by a journal-stud to said central beam to overhang the coupling, a rod connecting this disk with the seed-slide, an axle, arms I, rigidly secured to the axle, but adjustable longitudinally thereof, and arms G, connected at one end by pivots to the central beam and at the other end by connecting-rods to opposite sides of the disk, substantially as described.

2. The combination of the front frame having seed-boxes and a slide, the rear frame having a central beam connected to the front frame, a recessed disk, rods c, pivoted arms G, connecting-rods f', the axle, and adjustable arms I, all arranged as described, a ratchet-wheel and markers fixed to the axle, a sliding lever pivoted upon the axle and provided with a fixed pawl to engage said ratchet, a fixed catch to hold the lever out of operative position, a second ratchet-wheel fixed to rotate with the axle, the supporting-wheels, and the spring-pawl secured to one of said wheels to engage said second ratchet-wheel.

In testimony whereof I affix my signature in presence of two witnesses.

JAMES W. CRAIG.

Witnesses:
 THOS. HASTY,
 WM. BRAMHALL.